United States Patent
Chen

(10) Patent No.: US 7,558,168 B2
(45) Date of Patent: Jul. 7, 2009

(54) OPTICAL PICKUP DEVICE WITH A TILT ADJUSTING ACTUATOR

(75) Inventor: Ga-Lane Chen, Fremont, CA (US)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 703 days.

(21) Appl. No.: 11/261,206

(22) Filed: Oct. 28, 2005

(65) Prior Publication Data

US 2006/0130087 A1 Jun. 15, 2006

(30) Foreign Application Priority Data

Dec. 15, 2004 (CN) ...................... 2004 1 0077564

(51) Int. Cl.
*G11B 7/00* (2006.01)
(52) U.S. Cl. ................. 369/44.32; 369/44.11
(58) Field of Classification Search ................. None
See application file for complete search history.

(56) References Cited

U.S. PATENT DOCUMENTS

| | | | |
|---|---|---|---|
| 5,956,188 A | 9/1999 | Lee | |
| 6,304,526 B1 | 10/2001 | Nagashima et al. | |
| 6,501,710 B2 | 12/2002 | Yokoyama et al. | |
| 7,266,058 B2* | 9/2007 | Naraoka | 369/44.32 |
| 2003/0112722 A1* | 6/2003 | Matsuura | 369/44.32 |
| 2004/0081039 A1 | 4/2004 | Naraoka | |
| 2005/0180278 A1* | 8/2005 | Suzuki et al. | 369/44.32 |

* cited by examiner

*Primary Examiner*—Joseph Feild
*Assistant Examiner*—Joseph Haley

(57) ABSTRACT

An optical pickup device includes a lens, a base plate, a supporting wall substantially perpendicular extending from the base plate, at least one cantilever beam, and at least one piezoelectric member. The lens is configured for converging a light beam onto an optical disc. The cantilever beam includes a fixing end and a free end. The fixing end is fixed in/attached to the supporting wall, and the free end suspends the lens thereat. The piezoelectric member is sandwiched between the free end and the base plate. The piezoelectric member is electrically polarizable along a polarization pivot thereof, and thus the length thereof along the pivot direction may be adjusted electrically. The polarization pivot is substantially perpendicular to the base plate and the cantilever beam.

11 Claims, 4 Drawing Sheets

OPTICAL PICKUP DEVICE WITH A TILT ADJUSTING ACTUATOR

FIELD OF THE INVENTION

The present invention generally relates to an optical pickup device for irradiating a light beam onto a recording medium to read and/or record information from and/or to the recording medium and, more particularly, to an optical pickup device with a tilt adjusting actuator for adjusting an optical axis of a lens to compensate for the tilt of the recording medium.

BACKGROUND OF THE INVENTION

An optical disc has received attention as a memory medium that becomes a core in the recent rapid development of multimedia. The optical disc is loaded into an optical disc drive to perform reading/writing of data from/to the optical disc by means of an optical pickup head.

In order to improve the reliability of optical discs, it is necessary to store and reproduce high-quality signals to and from the optical discs. If there is a tilt angle of a recording surface of the optical disc with respect to an optical axis of a lens of the optical pickup head, then an aberration occurs in a light spot converged on the optical disc. As such, it becomes difficult to record and reproduce high-quality signals on the optical disc. Therefore, in order to record and/or reproduce high-quality signals to and/or from the optical disc, it is necessary to detect the aforementioned tilt angle accurately and to then correct this tilt angle.

As shown in FIG. 4, a conventional optical pickup head 100 includes a lens 90, a lens holder 80, several metal wires 70, a bracket 60, and a base 50. The lens 90 is held by the lens holder 80, and the lens holder 80, in turn, is suspended by the metal wires 70. The metal wires 70 are fixed in the bracket 60 extending upward from the base 50. A pair of magnets 81 is respectively secured to two lateral sides of a bottom of the lens holder 80. Opposite to the corresponding magnet 81, a yoke 51 with a coil 53 wound thereon extends upwardly from the base 50. Two ends of the coil 53 are connected to a power supply (not shown). A magnetic field may thereby be induced when a current is supplied to the coil 53. When the optical pickup head 100 is reading or recording an optical disc (not shown), a detector (not shown) detects a tilt angle between the optical disc and an optical axis of the lens 90, and a controller (not shown) controls a magnitude and direction of a current outputted by the power supply based on the detected tilt angle. As the output voltage of the power supply varies, the induced magnetic field of the coil 53 varies accordingly. An attraction interaction or a repulsion interaction between the magnet 81 and the coil 53 results in a position change of the lens holder 80, so that a tilt adjustment is achieved.

The optical pickup head 100 adopts an electromagnetic tilt adjusting device. Besides the tilt adjusting device, most optical pickup heads also have a focus adjusting device and a track adjusting device. The focus adjusting device and the track adjusting device are usually electromagnetic adjusting devices. If the optical pickup 100 has another electromagnetic adjusting device besides the electromagnetic tilt adjusting device, a magnetic interference may arise between such electromagnetic devices.

Therefore, a heretofore unaddressed need exists in the industry to address the aforementioned deficiencies and inadequacies.

SUMMARY OF THE INVENTION

Briefly described, one embodiment of a tray for a disc drive uses a piezoelectric element to eliminate any tilting of the optical lens of the optical pickup device.

An optical pickup device includes a lens, a base plate, a supporting wall substantially perpendicular extending from the base plate, at least one cantilever beam, and at least one piezoelectric member. The lens is configured for converging a light beam onto an optical disc. The cantilever beam includes a fixing end and a free end. The fixing end is fixed in and attached to the supporting wall, and the free end suspends the lens thereat. The piezoelectric member is sandwiched between the free end and the base plate, and configured to support the free end of the cantilever beam. The piezoelectric member is electrically polarizable along a polarization pivot thereof. The polarization pivot is substantially perpendicular to the base plate and the cantilever beam.

Other systems, methods, features, and advantages of the present optical pickup device will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present optical pickup device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF PREFERRED EMBODIMENTS

Figure 1:
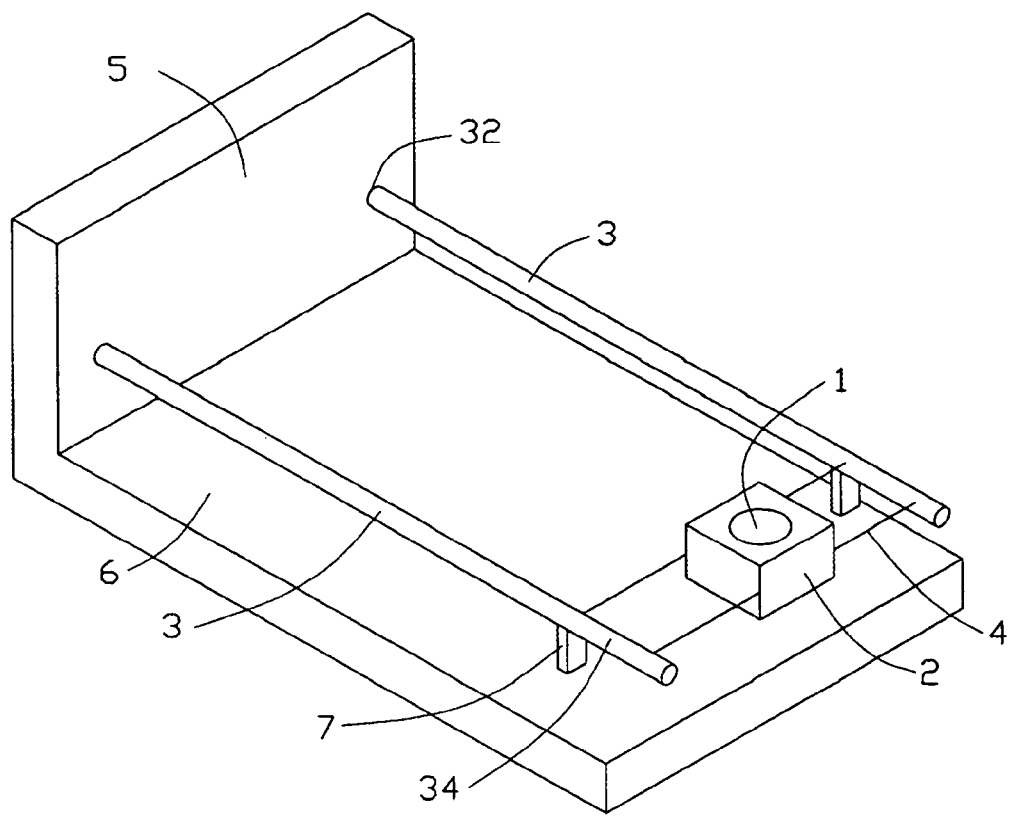
FIG. 1 is an isometric view of an optical pickup device in accordance with an exemplary embodiment thereof.

Reference will now be made to the drawing figures to describe the preferred embodiments of the present optical pickup device, in detail.

Referring to FIG. 1, an optical pickup device 99 includes a lens 1, a lens holder 2, a pair of cantilever beams 3, several wires 4, a supporting wall 5, a base plate 6, and a pair of piezoelectric member 7. The supporting wall 5 perpendicularly extends from a side of the base plate 6. Respective fixing ends 32 of the pair of cantilever beams 3 are fixed in and/or attached to the supporting wall 5, while free ends 34 of the cantilever beams 3 are supported by a pair of piezoelectric members 7. The piezoelectric members 7 are sandwiched between the base plate 6 and the free ends 34 of the cantilever beams 3. The lens 1 is held by the lens holder 2, while the lens holder 2 is suspended on the free ends 34 of the pair of cantilever beams 3 by the several wires 4. Two polarizing ends 72, 74 of the piezoelectric members 7 are respectively connected to an alterable/adjustable power supply (not shown). That is, the central polarization pivots of the piezoelectric members 7 are perpendicular to both the base plate 6 and the cantilever beams 3.

An unusual characteristic of certain crystalline minerals has been discovered in 1880. When subjected to a mechanical force, the crystals become electrically polarized. Tension and compression generate voltages of opposite polarity, in proportion to the applied force. The converse of this relationship has also been confirmed: if one of these voltage-generating crystals is exposed to an electric field it lengthens or shortens, according to the polarity of the field and in proportion to the strength of the field. These behaviors are labeled the piezoelectric effect and the inverse piezoelectric effect, respectively.

According to the inverse piezoelectric effect, when an output voltage of the power supply varies, heights of the piezoelectric members 7 vary accordingly. As the heights of the piezoelectric members 7 change, the free ends 34 of the cantilever beams 3 rise or fall, so that an angle of the lens 1 suspended on the cantilever beams 3 with respect to the base plate 6 changes. Thus, a tilt angle can be adjusted.

Figure 2A:
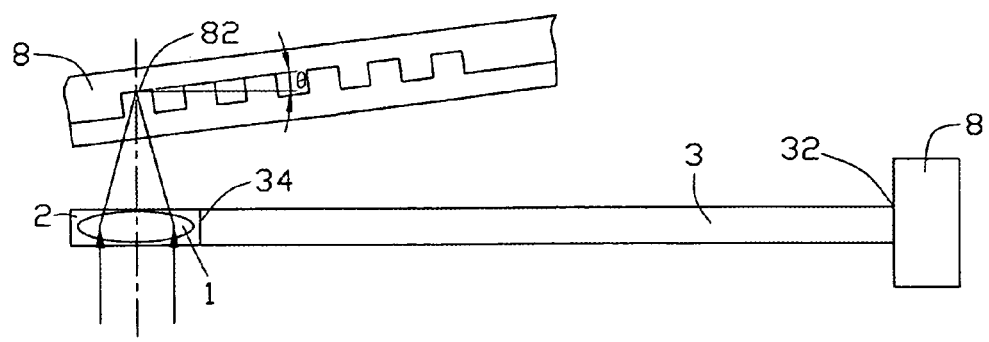
FIG. 2A and FIG. 2B schematically show, from a side view, two different states of part of the optical pickup device of FIG. 1, and also show part of an optical disc in relation thereto.

Now referring to FIG. 2A, when the optical pickup device 99 is reading from and/or recording to an optical disc 8, the optical pickup device 99 irradiates a light beam (not labeled) towards the optical disc 8. The lens 1 converges the light beam and forms a focus spot (not shown) on a recording surface 82 of the optical disc 8. An optical axis of the lens 1 should be substantially perpendicular to the recording surface 82 of the optical disc 8. If the optical disc 8 is not positioned horizontally, a tilt angle θ, between the recording surface 82 of the optical disc 8 and a surface perpendicular to the optical axis of the lens 1, is induced. Due to the presence of this tilt angle θ, an aberration may occur in the focus spot on the recording surface 82. The optical pickup device 99 irradiates a detecting light beam together with the reading light beam to the optical disc 8, and the optical disc 8 returns a light beam to a detector (not shown). The detector analyzes the return light beam, calculates the tilt angle θ, and sends out a tilt error signal. The tilt error signal is sent to the power supply of the piezoelectric members 7, and the output voltage of the power supply changes, corresponding to the tilt error signal.

Figure 2B:
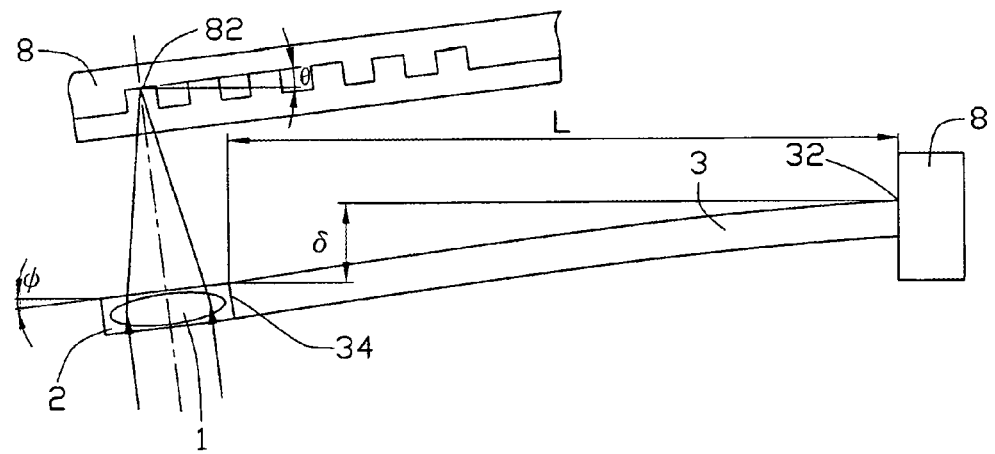

Now referring to FIG. 2B, when the power supply is supplied to the piezoelectric members 7, the piezoelectric members 7 lengthens or shortens corresponding to the power supply. A displacement δ is induced to the free ends 34 of the cantilever beams 3, since the free ends 34 are supported by the piezoelectric members 7. As a result of the displacement 6, a displacement angle ψ is induced relative to the lens holder 2, as well as the lens 1. If the displacement angle ψ of the lens 1 equals the tilt angle θ of the optical disc 8, the displacement angle ψ successfully compensates for the tilt angle θ, and a tilt adjustment is actualized. It is to be understood that any system that compensates at least partially for the tilt angle θ by inducing some displacement angle ψ through the use of at least one piezoelectric member 7 is considered to be within the scope of the present optical pickup device.

In order to obtain an accurate displacement angle, the following equation is applied.

$$\delta = PL^3/3EI \quad [1]$$

where:
P is the load that the piezoelectric members 7 apply on the cantilever beams 3;
L is a length of the cantilever beams 3;
E is Young's modulus of the cantilever beams 3;
I is the moment of inertia of the cantilever beams 3; and
δ is the maximum deflection of the cantilever beams 3.

It is known that the displacement angle ψ is in proportion to δ/L, therefore the following formula can be derived:

$$\psi \propto PL^2/EI \quad [2]$$

Figure 3A:
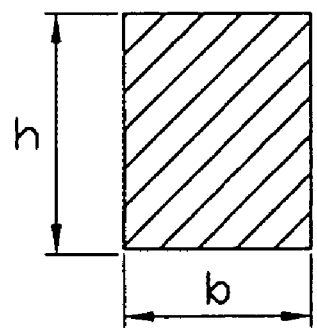
FIG. 3A, FIG. 3B, and FIG. 3C, respectively, show, in cross section, three exemplary embodiments of a cantilever beam of the optical pickup device.
Figure 3B:
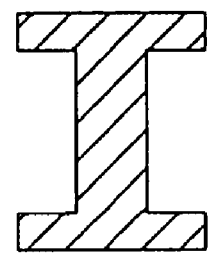
Figure 3C:
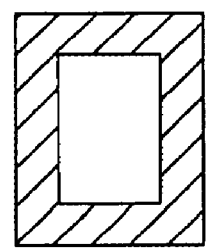
Figure 4:
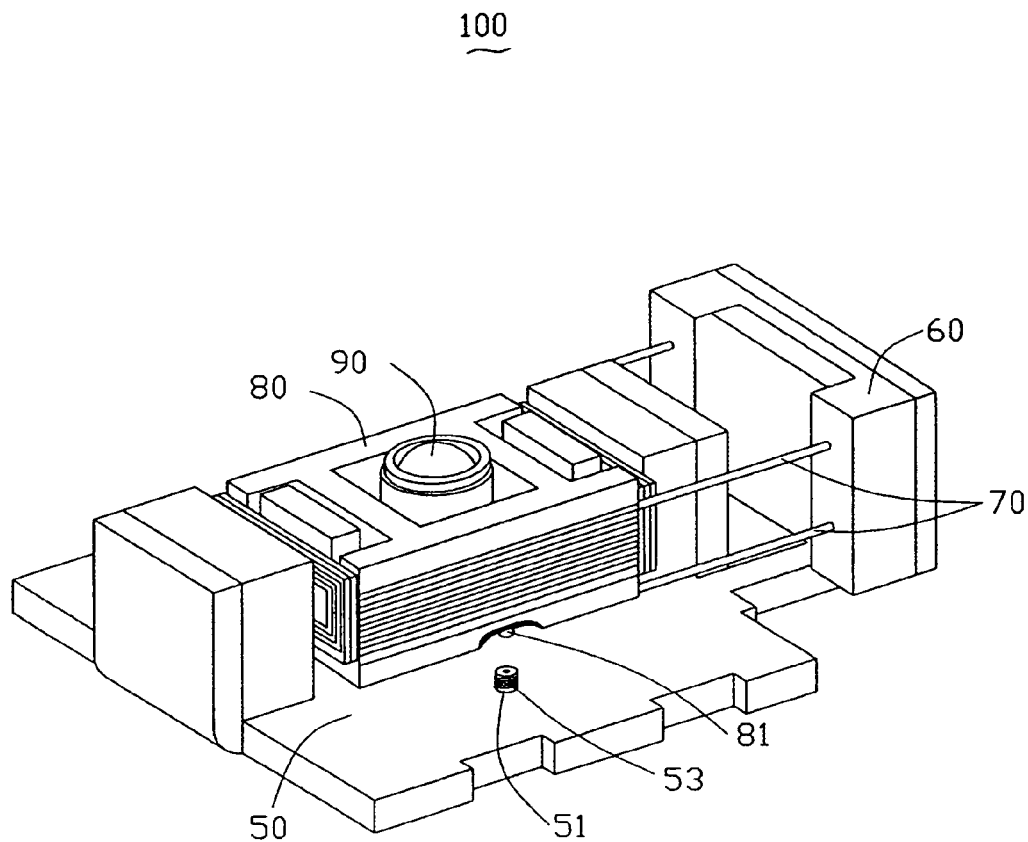
FIG. 4 is an isometric, schematic view of a conventional optical pickup device.

Further, the moment I of inertia depends on a cross section of the cantilever beams 3. As shown in FIG. 3A to FIG. 3C, the cantilever beams 3 can have different cross sections. The cantilever beam 3 can, for example, have a rectangular cross section (shown in FIG. 3A), an I-shaped cross section (shown in FIG. 3B), or a frame-shaped cross section (shown in FIG. 3C). The rectangular cross section is used as an example in the following text to calculate the moment of inertia of the cantilever beams 3. The moment I of inertia of the cantilever beams 3 can be expressed with the following equation:

$$I = bh^3/12 \quad [3]$$

where:
b is the width of the rectangular cross section; and
h is the height of the rectangular cross section.

According to equation [2] and formula [3], the following formula can be derived:

$$\psi \propto PL^2/Ebh^3 \quad [4]$$

The parameters E, L, b, h rely on the material and shape of the cantilever beams 3. If the length and the cross section of cantilever beams 3 are predetermined, the displacement angle ψ of lens 1 is in proportion to the load P applied on the cantilever beams 3. It is easy to adjust the displacement angle ψ of the lens 1 by directly adjusting the load P applied on the cantilever beams 3 by the piezoelectric members 7. The cantilever beams 3 are made of a piezoelectric material, such as ZnO, LiNbO$_3$, LiTaO$_3$, and BaTiO$_3$, or a combination thereof.

In alternative embodiments, another pair of piezoelectric members may be positioned respectively between a plate parallel to the base plate 6, above the cantilever beams 7, and the cantilever beams 3. One of the piezoelectric member 7 under the cantilever beams 3 and the piezoelectric member 7 above the cantilever beams 3 lengthens, while the other shortens. Further, the lens 1 may also be directly suspended at the free end 34 of one of the cantilever beams 3. Accordingly, the other cantilever beam 3 and the wires 4 can be omitted.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. An optical pickup device comprising:
   a lens configured for converging a light beam onto an optical disc;

a base plate;

a supporting wall extending substantially perpendicularly from said base plate;

at least one cantilever beam comprising a fixing end and a free end, said fixing end being at least one of fixed in and attached to said supporting wall, said free end suspending the lens thereat; and at least one piezoelectric member sandwiched between said free end of said at least one cantilever beam and said base plate, said at least one piezoelectric member thereby being configured to support said free end of said at least one cantilever beam, said at least one piezoelectric member being electrically polarizable along a polarization pivot thereof, the polarization pivot being substantially perpendicular to said base plate and said at least one cantilever beam.

2. The optical pickup device according to claim 1, wherein said at least one piezoelectric member is configured for deforming along the polarization pivot thereof due to a change in power supplied thereto, said at least one piezoelectric member thereby being configured for altering an angle of an optical axis of said lens relative to a recording surface of the optical disc.

3. The optical pickup device according to claim 1, wherein said at least one cantilever beam is a pair of cantilever beams.

4. The optical pickup device according to claim 3, further comprising a plurality of wires, said lens being suspended by the plurality of wires, said plurality of wires being fixed on said free ends of said at least one cantilever beam.

5. The optical pickup device according to claim 1, wherein said at least one cantilever beam is comprised of a material chosen from a group consisting of $ZnO$, $LiNbO_3$, $LiTaO_3$, and $BaTiO_3$.

6. An optical pickup device for reading and/or recording an optical disc, the optical pickup device comprising:

a lens configured for converging a light beam therethrough to a recording surface of the optical disc;

a tilt adjusting actuator configured for adjusting an angle of said lens with respect to the recording surface of the optical disc, the tilt adjusting actuator comprising:

at least one cantilever beam having a free end, said lens hanging at the free end thereof; and at least one piezoelectric member configured for receiving an adjustable supply of electric power, each said piezoelectric member being attached to a corresponding said cantilever beam, each said piezoelectric member having a polarization pivot oriented relative to a length thereof, each said polarization pivot being substantially perpendicular to the corresponding said cantilever beam, the polarization pivot being substantially parallel to the optical axis of said lens.

7. The optical pickup device according to claim 6, further comprising a base plate configured for securing said tilt adjusting actuator and a wall extending substantially perpendicularly from said base plate, each said cantilever beam having a corresponding fixing end, said corresponding fixing end being perpendicularly secured to said wall.

8. The optical pickup device according to claim 7, wherein each said piezoelectric member is sandwiched between said base plate and said free end of said cantilever beam corresponding thereto, said polarization pivot of each said piezoelectric member being perpendicular to said base plate.

9. The optical pickup device according to claim 6, wherein each said piezoelectric member is deformable along the polarization pivot due to a change in electric power supplied thereto, each said piezoelectric member thereby being configured for altering an angle of an optical axis of said lens relative to the recording surface of the optical disc.

10. The optical pickup device according to claim 9, wherein each said piezoelectric member is configured for altering the angle of the optical axis relative to the recording surface in such a manner so as to maintain a substantially perpendicular relationship therebetween.

11. The optical pickup device according to claim 6, wherein each said cantilever beam is comprised of at least one material chosen from a group consisting of $ZnO$, $LiNbO_3$, $LiTaO_3$, and $BaTiO_3$.

* * * * *